(12) United States Patent
Wu et al.

(10) Patent No.: US 8,913,128 B2
(45) Date of Patent: Dec. 16, 2014

(54) IMAGE-BASED BARRIER DETECTION AND WARNING SYSTEM AND METHOD THEREOF

(75) Inventors: Yu-Hsiang Wu, Changhua County (TW); Chia-Tseng Chen, Changhua County (TW); Ming-Feng Hsieh, Changhua County (TW); Yi-Feng Su, Changhua County (TW)

(73) Assignee: Automotive Research & Test Center, Changhua County (TW)

( * ) Notice: Subject to any disclaimer, the term of this patent is extended or adjusted under 35 U.S.C. 154(b) by 450 days.

(21) Appl. No.: 13/033,154

(22) Filed: Feb. 23, 2011

(65) Prior Publication Data
US 2012/0162415 A1 Jun. 28, 2012

(30) Foreign Application Priority Data
Dec. 28, 2010 (TW) ................................ 99146425 A

(51) Int. Cl.
*H04N 7/18* (2006.01)
(52) U.S. Cl.
CPC ...................................... *H04N 7/18* (2013.01)
USPC ........ 348/142; 180/167; 250/208.1; 340/435; 342/70; 348/46; 348/148; 348/175; 382/103; 382/104; 382/171; 382/173; 382/199; 701/36; 701/41; 701/96
(58) Field of Classification Search
CPC ... H04N 7/18; G06K 9/00791; G06K 9/3241; G06T 7/0044; G06T 7/0083
USPC ...................... 348/142, 148; 701/41; 382/103
IPC .......................................................... H04N 7/18
See application file for complete search history.

(56) References Cited

U.S. PATENT DOCUMENTS

| | | | |
|---|---|---|---|
| 6,788,817 B1* | 9/2004 | Saka et al. ..................... | 382/199 |
| 2004/0057599 A1* | 3/2004 | Okada et al. .................. | 382/103 |
| 2006/0184297 A1* | 8/2006 | Higgins-Luthman ........... | 701/41 |
| 2007/0255480 A1* | 11/2007 | Southall et al. ................. | 701/96 |
| 2009/0296987 A1* | 12/2009 | Kageyama et al. ........... | 382/103 |
| 2011/0115912 A1* | 5/2011 | Kuehnle ....................... | 348/148 |
| 2011/0235913 A1 | 9/2011 | Liu et al. | |

FOREIGN PATENT DOCUMENTS

| CN | 1782668 A | 6/2006 |
|---|---|---|
| CN | 101436300 A | 5/2009 |

* cited by examiner

*Primary Examiner* — Jay Patel
*Assistant Examiner* — Neil Mikeska
(74) *Attorney, Agent, or Firm* — Rosenberg, Klein & Lee

(57) ABSTRACT

The present invention discloses an image-based barrier detection and warning system and a method thereof, wherein an image processing technology is used to establish ROI and verify whether a horizontal line signal exists, and wherein the image processing technology determines whether an object is a barrier via detecting contours of an object and detecting distance to the object, and wherein the system timely outputs warning signals and presents distance to a barrier when detecting the barrier. The image-based barrier detection and warning system enables the driver to watch the surroundings of the vehicle directly and clearly and learn the relative positions of barriers, whereby the driver can park more easily and safely.

10 Claims, 16 Drawing Sheets

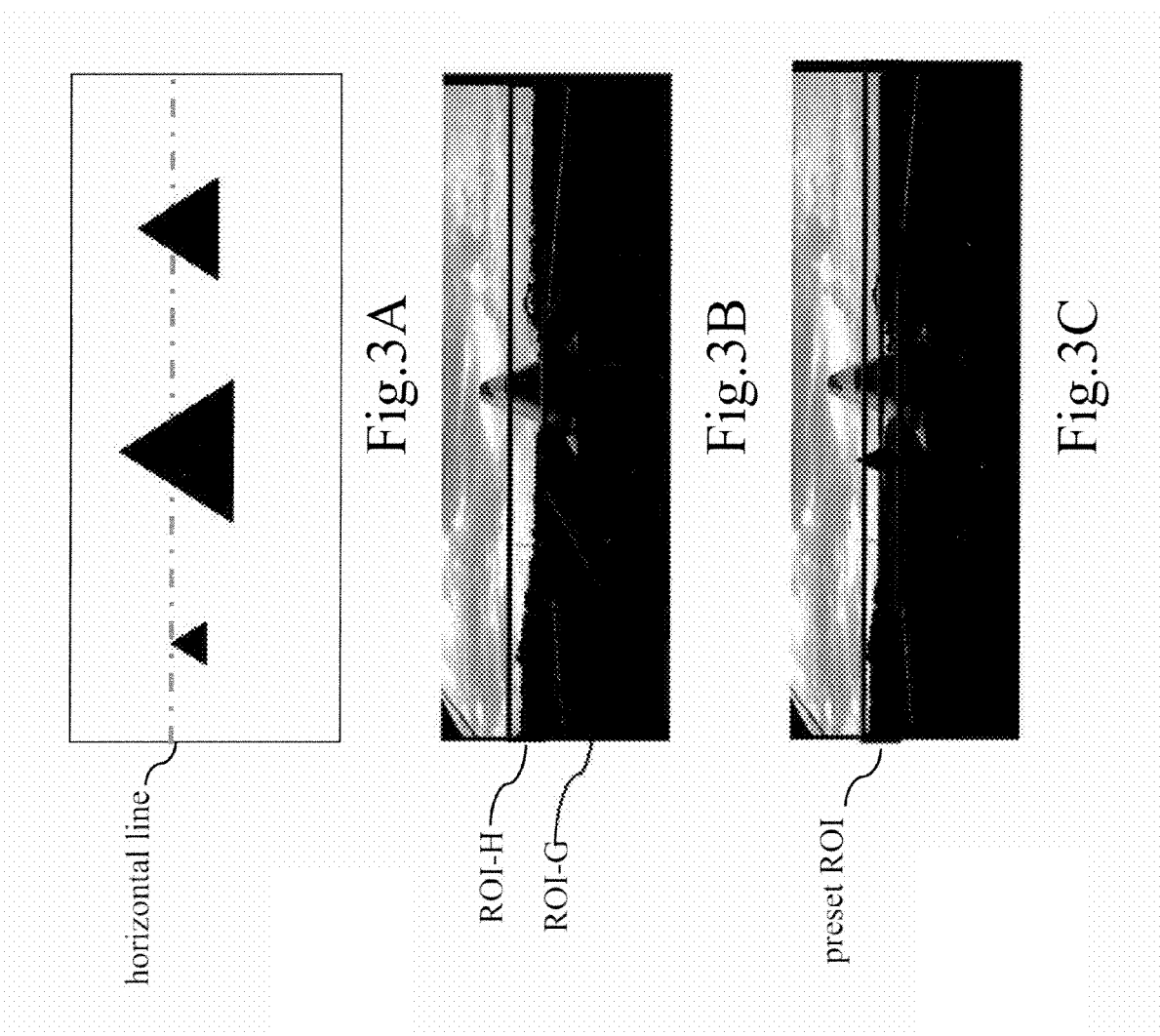

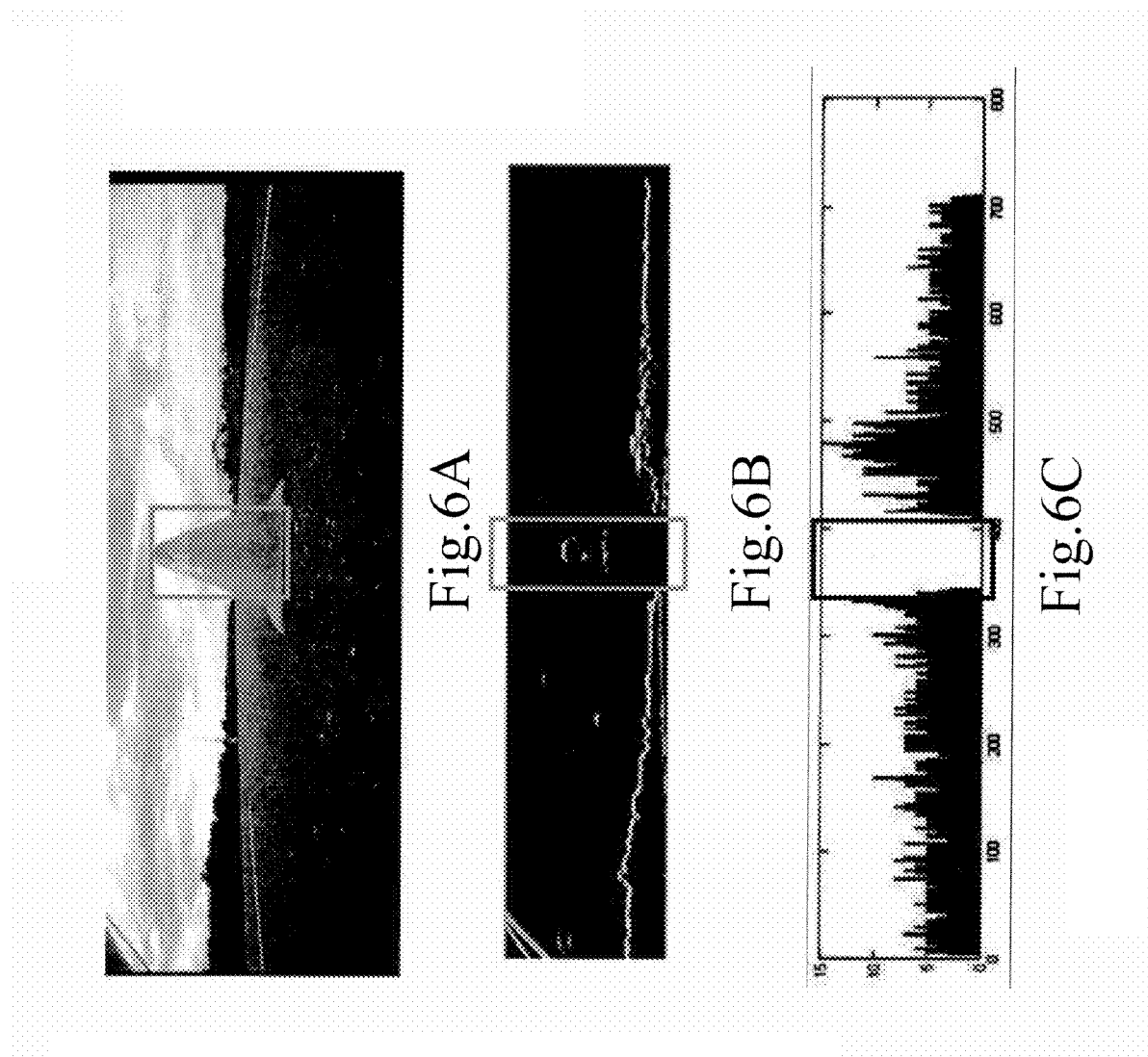

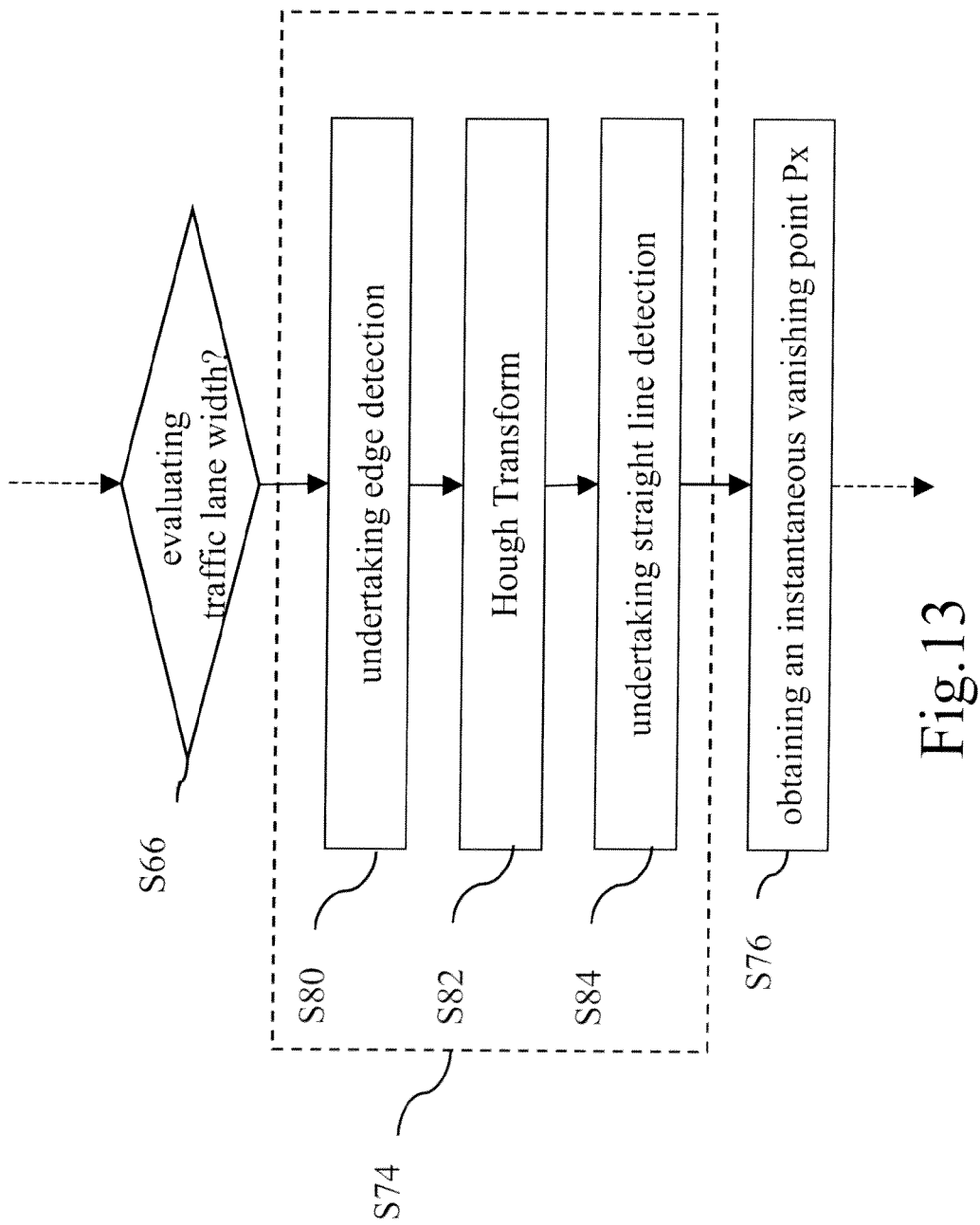

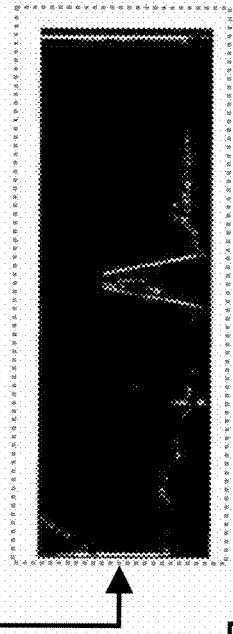
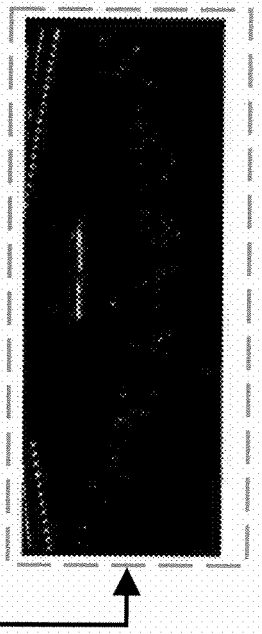
Fig.14B
Fig.14C
Fig.14D
Fig.14A

IMAGE-BASED BARRIER DETECTION AND WARNING SYSTEM AND METHOD THEREOF

BACKGROUND OF THE INVENTION

1. Field of the Invention

The present relates to a barrier detection and warning system and a method thereof, particularly to an image-based barrier detection and warning system and a method thereof.

2. Description of the Related Art

It is uneasy for most drivers to drive a car on streets full of vehicles. Many are flustered in parking a car into a narrow parking lot on a crowed street. Inappropriate driving will cause collision between the car and a barrier. If there are warning systems to warn drivers timely, many accidents should not happen.

Fortunately, a lot of PGS (Parking Guidance System) and PAS (Parking Assistance System) have been developed to meet requirement of drivers. The conventional PGS and PAS systems usually use radar or ultrasonic signals to detect barriers. However, radar devices and ultrasonic devices are unlikely to recognize the environment. Thus is reduced the recognizability of the conventional PUS and PAS systems. Further, the electromagnetic wave of radar may harm human beings. Thus, some new technologies are emerging to gradually replace the conventional radar and ultrasonic systems.

Image-based detection systems are potential substitutes to the conventional detection systems. A China patent No. CN101436300 disclosed a barrier discrimination method and a device thereof, which uses edges and straight lines to detect barriers. A China patent No. CN1782668 disclosed an image-based collision prevention method and a device thereof, which uses horizontal lines, shadows, and brightness decrement of reflected light to detect barriers. The image-based technologies adopt a single camera or a plurality of cameras to capture images. The single camera system has advantages of high integratability, low price and easy installation. However, the single camera system can neither construct 3D views nor overcome distance estimation errors caused by vibration or angle variation. The multi-camera system has disadvantages of high computation amount and inconvenient installation. The multi-camera system spends much more time in computation than the single-camera system and thus cannot provide appropriate information for the drive in realtime.

Accordingly, the present invention proposes an image-based barrier detection and warning system and a method thereof, which uses a single camera but has a recognizability higher than a multi-camera system, and which further has a lower fabrication cost.

SUMMARY OF THE INVENTION

The primary objective of the present invention is to provide a an image-based barrier detection and warning system and a method thereof, which uses a single camera but provides more direct and more complete traffic information for drivers, and which is easy to install and has lower fabrication cost.

Another objective of the present invention is to provide a high-efficiency image-based barrier detection and warning method, which has a recognizability higher than the recognizability of a multi-camera system presenting 3D views, and which can prevent the system from erroneous judgments or oversensitivity, and which needn't use a plurality of cameras and thus is exempted from massive computation and difficult installation, and which replaces the conventional radar-based and ultrasonic-based detection technologies with an image processing technology and a computer vision technology, and which presents the surroundings of a vehicle and relative positions of barriers on a display of a waning device, and which timely reminds the driver of barriers to improve convenience and safety of backing the vehicle, and which warns the driver of dangers to reduce probability of accidents.

The image-based barrier detection and warning system of the present invention comprises at least one image capture device, at least one processing device and at least one warning device. The image capture device is installed at such as the rear part of a vehicle to detect a barrier having a specified height. The system of the present invention may further comprise at least one external signal pickup unit.

The image-based barrier detection and warning method of the present invention comprises a horizontal line detection algorithm, a barrier height and width detection algorithm and a barrier's distance calculation algorithm, which are built in a processing device and function as the decision core. After defining a horizontal line, ROI-H (Region Of Interest-Height) and ROI-G (Region Of Interest-Ground), the method of the present invention examines whether the horizontal line signal is shaded in ROI-H and detects the contours of a barrier. Next, the method determines whether a barrier exists according to the position and height of the horizontal edges. The method also calculates the distance between an image capture unit and a barrier in ROI-G. When a barrier is detected, a warning device emits a warning signal and presents the distance between the image capture unit and the barrier.

Below, the embodiments are described in detail in cooperation with the attached drawings to make easily understood the objectives, technical contents, characteristics and accomplishments of the present invention.

BRIEF DESCRIPTION OF THE DRAWINGS

FIG. 3A is a diagram schematically showing the definition of a horizontal line according to one embodiment of the present invention;

FIG. 3B is a diagram schematically showing the definition of ROI according to one embodiment of the present invention;

FIG. 3C is a diagram schematically showing a preset ROI according to one embodiment of the present invention;

FIG. 6A shows that a barrier is designated in a physical image according to one embodiment of the present invention;

FIG. 6B shows that a barrier is designated in a gray-level diagram according to one embodiment of the present invention;

FIG. 6C shows that a barrier is designated in a histogram diagram according to one embodiment of the present invention;

FIG. 13 is a flowchart of generating a virtual traffic lane line according to one embodiment of the present invention;

FIG. 14A is a diagram schematically showing that an image is partitioned into an upper half image and a lower half image according to one embodiment of the present invention;

FIG. 14B is a diagram schematically showing the heights of horizontal edges of the upper half image according to one embodiment of the present invention;

FIG. 14C is a diagram schematically showing the heights of vertical edges of the upper half image according to one embodiment of the present invention;

FIG. 14D is a diagram schematically showing the heights of the horizontal bottom edges of the lower half image according to one embodiment of the present invention.

DETAILED DESCRIPTION OF THE INVENTION

Figure 1:
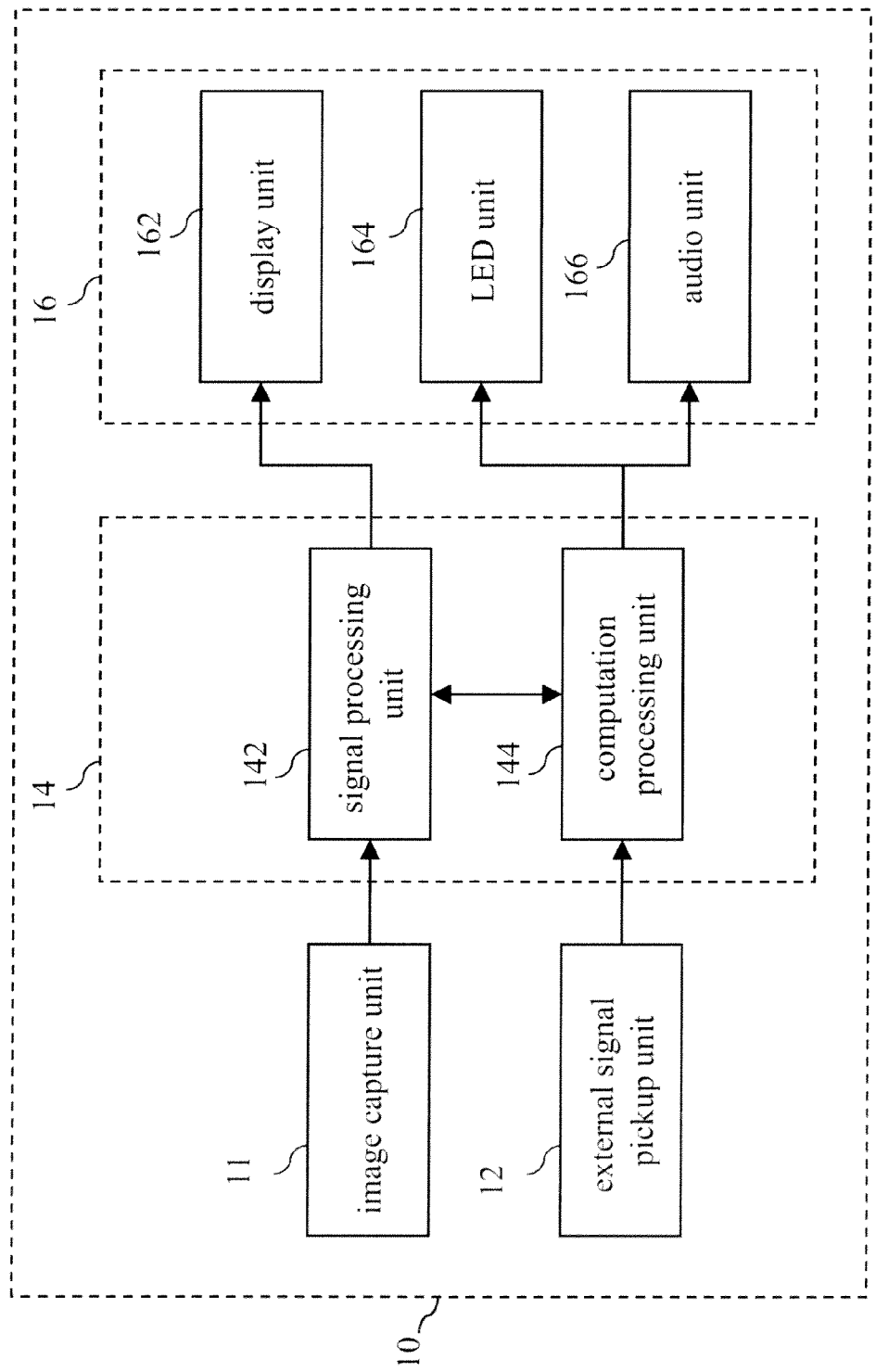
FIG. 1 is a block diagram schematically showing an image-based barrier detection and warning system according to one embodiment of the present invention.

Refer to FIG. 1 a block diagram schematically showing an image-based barrier detection and warning system according to one embodiment of the present invention. The image-based barrier detection and warning system 10 comprises at least one image capture unit 11, at least one processing device 14 and at least one warning device 16. The image capture unit 11 is electrically connected with the processing device 14. The image capture unit 11 may be CCD (Charge-Coupled Device) or a CMOS (Complementary Metal Oxide Semiconductor) device. The processing device 14 is optionally electrically connected with an external signal pickup unit 12 to receive external signals, such as speed signals, shift signals, steering wheel signals, etc. The processing device 14 includes at least one signal processing unit 142 and at least one computation processing unit 144 electrically connected with the signal processing unit 142. The computation processing unit 144 may be CPU (Central Processing Unit), μP (Micro Processor), or a single-chip microprocessor. A horizontal line detection algorithm, a barrier height and width detection algorithm and a barrier's distance calculation algorithm are built in the computation processing unit 144 to function as a processing core of the execution process. The signal processing unit 142 is a digital signal processor (DSP) electrically connected with the image capture unit 11 to perform conversion of image signals and generate warning signals. The processing device 14 is electrically connected with the warning device 16 and outputs decision signals to instruct the warning device 16 to timely send out warning signals to alarm the driver. The warning device 16 may be one of a display unit 162, a LED unit 164 and an audio unit 166, or includes at least two of them. The display unit 162 presents system statuses and distances between the image capture unit 11 and barriers. The LED unit 164 emits an emergency alert. The audio unit 166 emits voices to remind the driver of the approaching states of barriers. The display unit 162 is a display device, such as CRT (Cathode Ray Tube), LCD (Liquid Crystal Display), or PDP (Plasma Display Panel). The LED unit 164 may adopt LED (Light Emitting Diode) elements or OLED (Organic Light Emitting Diode) elements. The audio unit 166 may be one of a buzzer and a speaker, or includes both of them. The image-based barrier detection and warning system 10 can integrate with PGS or PAS to give the driver appropriate alerts.

Figure 2:
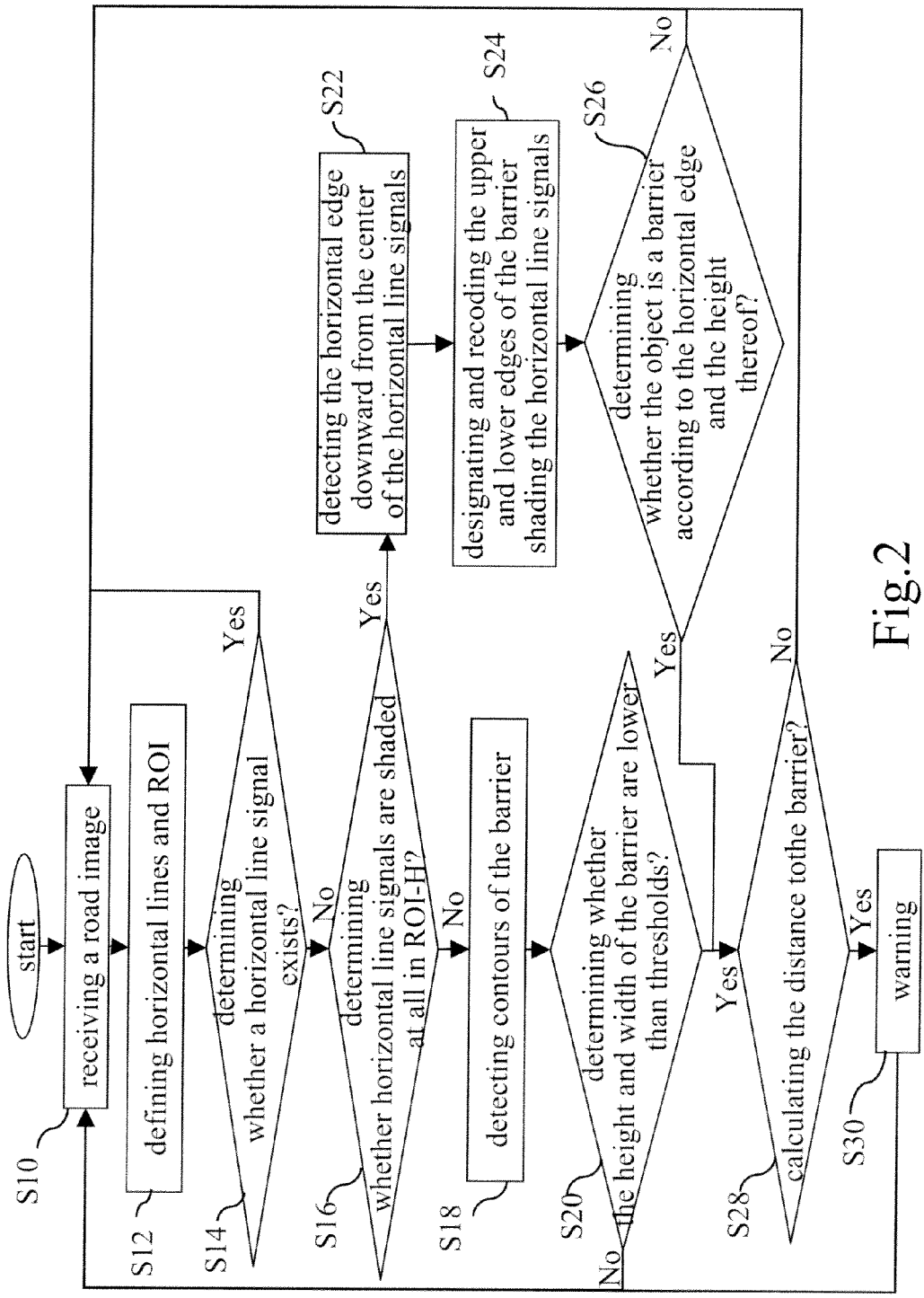
FIG. 2 is a flowchart of an image-based barrier detection and warning method according to one embodiment of the present invention.
Figure 3D:
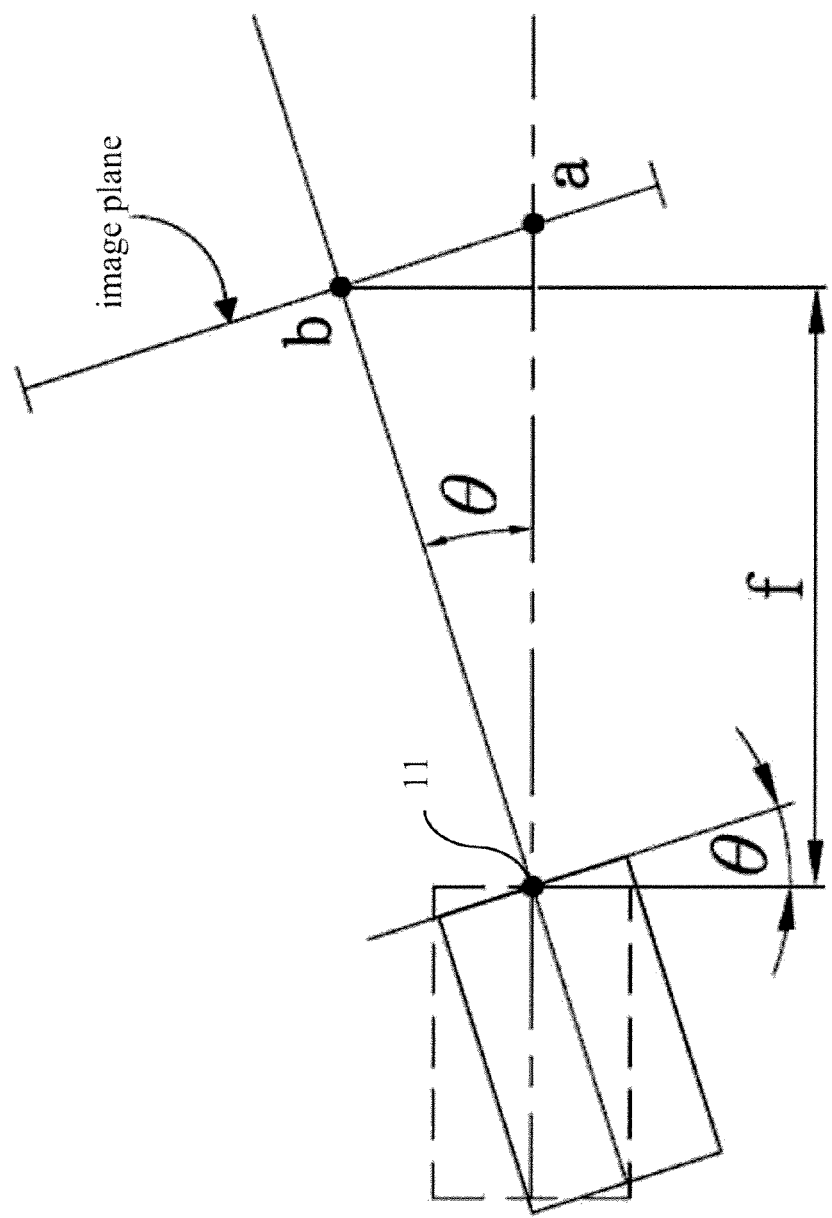
FIG. 3D is a diagram schematically showing the relationship between the focal length of an image capture unit and a preset horizontal line according to one embodiment of the present invention.
Figure 4A:
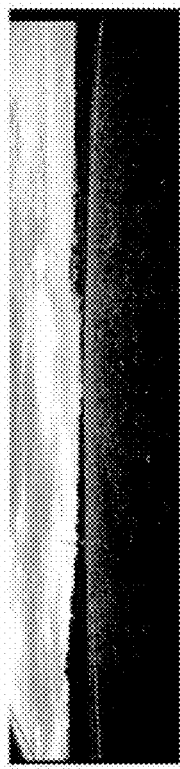
FIG. 4A is a road image having none barrier according to one embodiment of the present invention.
Figure 4B:
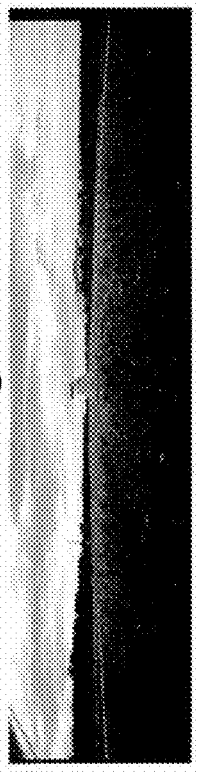
FIG. 4B is a road image having a barrier 3 m away from an image capture unit according to one embodiment of the present invention.
Figure 4C:
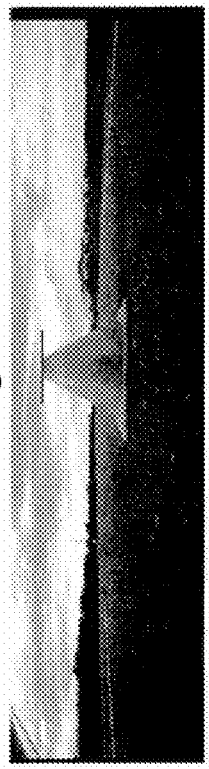
FIG. 4C is a road image having a barrier 1 m away from an image capture unit according to one embodiment of the present invention.
Figure 4D:
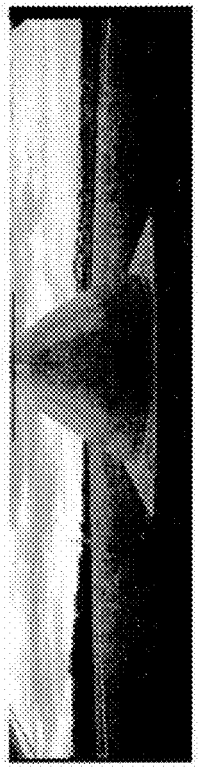
FIG. 4D is a road image having a barrier 0.5 m away from an image capture unit according to one embodiment of the present invention.
Figure 5A:
FIG. 5A is a gray-level diagram having none barrier according to one embodiment of the present invention.
Figure 5B:
FIG. 5B is a gray-level diagram having a barrier 3 m away from an image capture unit according to one embodiment of the present invention.
Figure 5C:
FIG. 5C is a gray-level diagram having a barrier 1 m away from an image capture unit according to one embodiment of the present invention.
Figure 5D:
FIG. 5D is a gray-level diagram having a barrier 0.5 m away from an image capture unit according to one embodiment of the present invention.

Refer to from FIG. 1 to FIG. 8. FIG. 2 is a flowchart of an image-based barrier detection and warning method according to one embodiment of the present invention. In Step S10, the processing device 14 receives an image of the road. In Step S12, the processing device 14 uses at least one traffic lane line to define horizontal lines and ROI (Region Of Interest). Refer to FIGS. 3A-3D for ROI ranges and a method to define ROI. Refer to FIG. 3A, wherein a horizontal line is defined. Refer to FIG. 3B, wherein ROI-H (Region Of Interest-Height) of a vanishing point horizontal line signal is preset in ROI to detect height of a barrier, and wherein ROI-G (Region Of Interest-Ground) is set in ROI to detect the position of the barrier. Refer to FIG. 3C. The image capture unit 11 adopts a common camera having a viewing angle of 130 degrees. The position of the horizontal line varies with the position and the elevation/depression angle of the camera. Therefore, the position of the horizontal line would vary because vibration of a running vehicle. When the detected object is a wall or the like vertical to the ground, the position of the horizontal line would vary also. Therefore, the position of a single segment is likely to be displaced. Refer to FIG. 3D for the relationship of a preset horizontal line and the angle and focal length of the image capture unit 11. How to obtain the function values is explained with Equation (1):

$$\theta = \tan^{-1}\frac{a-b}{f} \quad (1)$$

wherein θ is the included angle with respect to the central axis of the lens of the image capture unit 11, b the position of the preset vanishing point of the image plane, a the position of the vanishing point of the image plane. Thus, $\overline{ab}$ is the displacement of the horizontal line, and f is the distance between the lens of the image capture unit 11 and the image plane, i.e. the focal length.

After the position of the horizontal line has been set, a vanishing point horizontal line detection range is defined via respectively moving the horizontal line upward and downward to form areas each occupying 5-10% the total area of the image and having 30-35 pixels. In this embodiment, each area has 30 pixels and occupies 7.5% of the total area. Thereby is solved the problem of detecting a wall or the like vertical to the ground.

Refer to FIGS. 4A-4D and FIGS. 5A-5D. Different distances generate different shade effects. According to the geometrical principle of image forming, the processing device 14 works out from the focal length the distance to a barrier and the number of the pixels of the barrier, whereby are determined preset thresholds and a vanishing point horizontal detection range. Below is an exemplification of setting width of a barrier. The initial values of the distance to the barrier and the width of the barrier are respectively set to be 3 meters and 10 centimeters. A 10 cm wide barrier detected at a distance of 3 meters occupies an area of 10 pixels, which is set to be the preset threshold. Thus, an area of 10 pixels can accommodate a 7.5 cm wide barrier at a distance of 1.5 meters. The barrier proposed by ISO17386 is a cylinder having a diameter of 75 mm and a height of 1000 mm. The initial height of a barrier is set to be 30 cm at a distance of 3 m. Thus, a 30 cm wide barrier at a distance of 3 m can be detected. The camera is arranged at an altitude of 25 cm. A level of 30 cm has exceeded the connecting line between the camera and the vanishing point. Thus, the connecting line of the camera and the vanishing point would be shaded. After the camera has been set up, the position of a barrier can be worked out from the calibrated values of the parameters of the image capture unit 11 according to the geometrical relationship between the parameters and the distance.

Figure 7A:
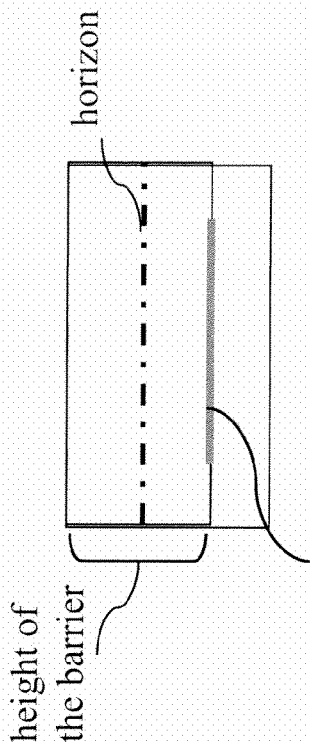
FIG. 7A shows the relationship between a barrier and preset thresholds in a physical image according to one embodiment of the present invention.
Figure 7B:
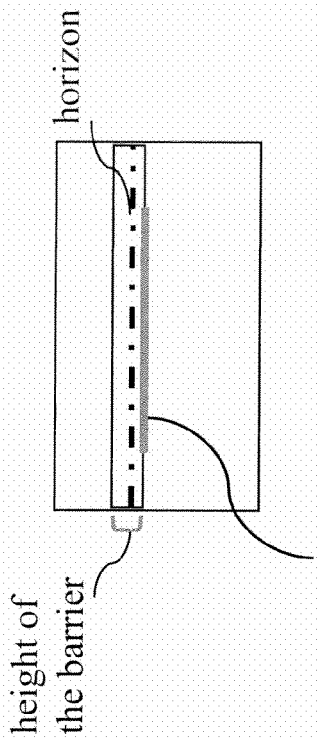
FIG. 7B is a diagram schematically showing that a barrier is greater than preset thresholds according to one embodiment of the present invention.
Figure 7C:
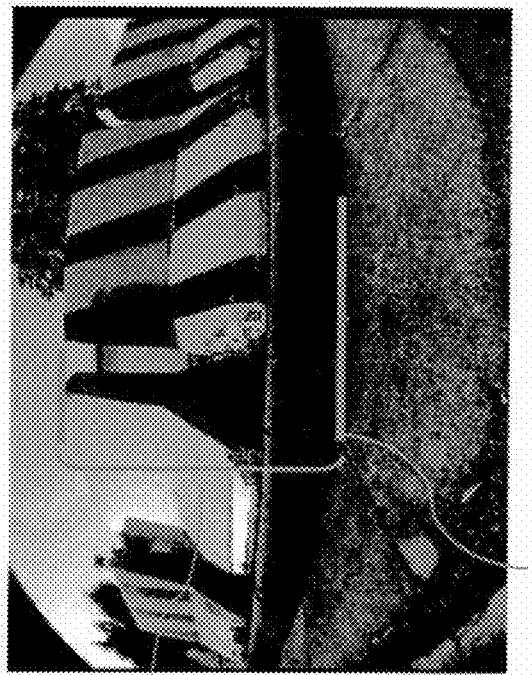
FIG. 7C is a diagram schematically showing that a barrier is smaller than preset thresholds according to one embodiment of the present invention.
Figure 8:
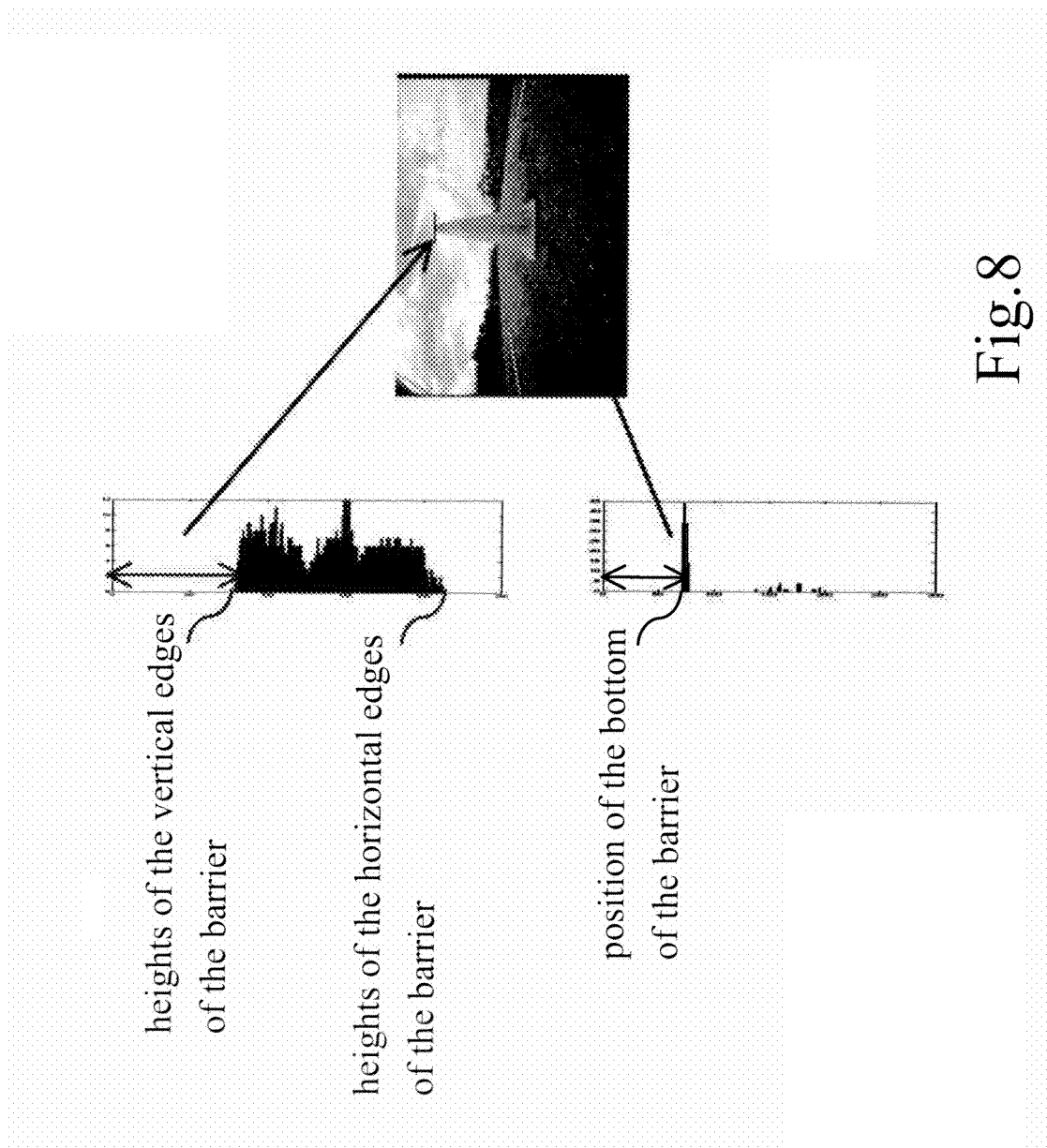
FIG. 8 shows vertical-axis histogram statistics according to one embodiment of the present invention.

After the processing device 14 has finishing the definition of the horizontal line and ROI, barrier detection is started. In Step S14, the processing device 14 determines whether a horizontal line signal exists. Refer to FIGS. 6A-6C. The present invention uses a Sobel or Canny filter of a high-frequency image technology to process the vertical and horizontal edge images and uses an expansion operation and an erosion operation to enhance the required edges. The horizontal edges are projected to the horizontal axis and then converted into a histogram. As shown in FIG. 6A, the barrier is designated in the physical image. As shown in FIG. 6B, the barrier is designated in the gray-level image. The horizontal edges are used to verify whether the horizontal line signals are shaded in ROI-H. As shown in FIG. 6C, when a barrier shades the horizontal line signals, a break appears in the histogram. The processing device 14 evaluates the elements lower than the threshold in the histogram to determine whether a barrier exists there, designates the region meeting the condition of a barrier and then records the height and width of the break in the histogram. In Step S14, the processing device 14 uses the built-in horizontal line detection algorithm to determine whether a horizontal line signal exists in ROI-H. If horizontal line signals exist in ROI-H, it is determined that there is no barrier, and the process returns to Step S10. If none horizontal line exists in ROI-H, it is determined that there may be a barrier, and the process proceeds to Step S16. In Step S16, the processing device 14 determines whether horizontal line signals are shaded at all in ROI-H. If horizontal line signals are not shaded at all, the process proceeds to Step S18 to use the barrier height and width detection algorithm to detect the upper and lower contours of the barrier shading the horizontal line signals and then record the positions of the top and bottom of each barrier. If horizontal line signals are shaded at all in ROI-H, the process proceeds to Step S22, and the processing device 14 detects the horizontal edge downward from the center of the horizontal line signals in ROI-H according to the horizontal line defined earlier. In Step S20, the processing device 14 further presets additional thresholds via ROI, determines whether the height and width of the barrier contour detected in Step 18 are lower than the preset thresholds, and compares the recorded height and width of the break in the histogram with the preset thresholds, wherein the comparison is primarily addressed to barrier height and secondarily to barrier width. FIG. 7A shows a preset threshold and a barrier in a physical image. Refer to FIG. 7B. When the detected barrier height and width are greater than the preset thresholds, it is determined that the volume of the barrier is large enough to retard the vehicle. Thus, the process proceeds to Step S28, and the processing device 14 uses the distance calculation algorithm to calculate the distance between the image capture unit 11 and the barrier. Refer to FIG. 7C. When the detected barrier height and width are not greater than the preset thresholds, it is determined that the volume of the barrier is insufficient to retard the vehicle. (The detected object may be a lane mark or an included angle between a wall and the ground.) In such a case, the process returns to Step S10. In Step S16, if horizontal line signals are shaded at all in ROI-H, the process proceeds to Step S22, and the processing device 14 detects the horizontal edge downward from the center of the horizontal line signals in ROI-H according to the horizontal line defined earlier. Then, the process proceeds to Step S24, the processing device 14 uses the high-frequency image information to designate the upper and lower edges of the barrier shading the horizontal line and records the position of the bottom of the barrier and the information of height, as shown in FIG. 8. In Step S26, the processing device 14 determines whether the object is a barrier according to the lower horizontal edge and the height of the object. If the processing device 14 determines the object to be a barrier, the process proceeds to Step S28, and the processing device 14 calculates the distance between the image capture unit 11 and the barrier. If the processing device 14 determines that the object is not a barrier according to the lower horizontal edge and the height of the object, the process returns to Step S10. If the processing device 14 determines that the barrier height and width are greater than the preset thresholds in Step S20, or if the processing device 14 determines that the object is a barrier according to the lower horizontal edge and the height of the object in Step S26, the process proceeds to Step S28, and the processing device 14 calculates the distance between the image capture unit 11 and the barrier. If the distance does not reach the preset range, the process returns to Step S10. If the distance reaches the preset range, the process proceeds to Step S30, and the warning device 16 begins to work, and the process simultaneously returns to Step S10 to keep on detecting barriers.

Figure 9:
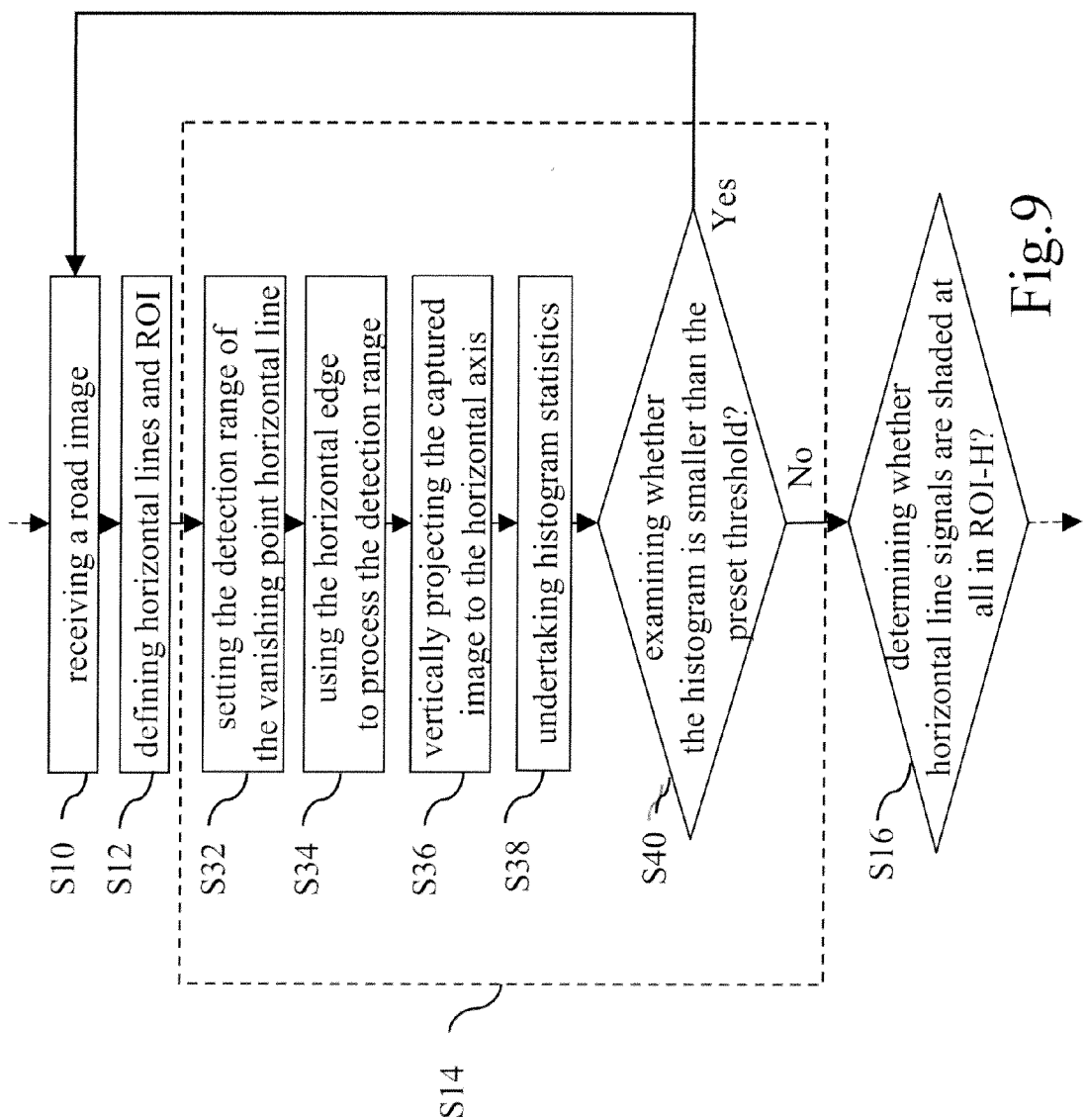
FIG. 9 is a flowchart of detecting continuity of a horizontal line according to one embodiment of the present invention.

Refer to FIG. 9. Step S14, which determines whether a horizontal line signal exists in ROI-H, further comprises Steps S32-S40. Refer to FIG. 1 and FIG. 2 also. After the processing device 14 receives a road image in Step S10, the process proceeds to Step S32 to set the detection range of the vanishing point horizontal line. Next, the process proceeds to Step S34 to use the horizontal edge to process the detection range of the vanishing point horizontal line. Next, the process proceeds to Step 36 to project the captured image to the horizontal axis. Next, the process proceeds to Step S38 to undertake histogram statistics. Next, the process proceeds to Step S40 to examine whether the histogram is smaller than the preset threshold. If the histogram is smaller than the preset threshold, it is determined that there is no barrier, and the process returns to Step S10. If the histogram is not smaller than the preset threshold, the processing device 14 determines that there may be a barrier, and the process proceeds to Step S16 to determine whether the horizontal line signals are shaded at all in ROI-H.

Figure 10:
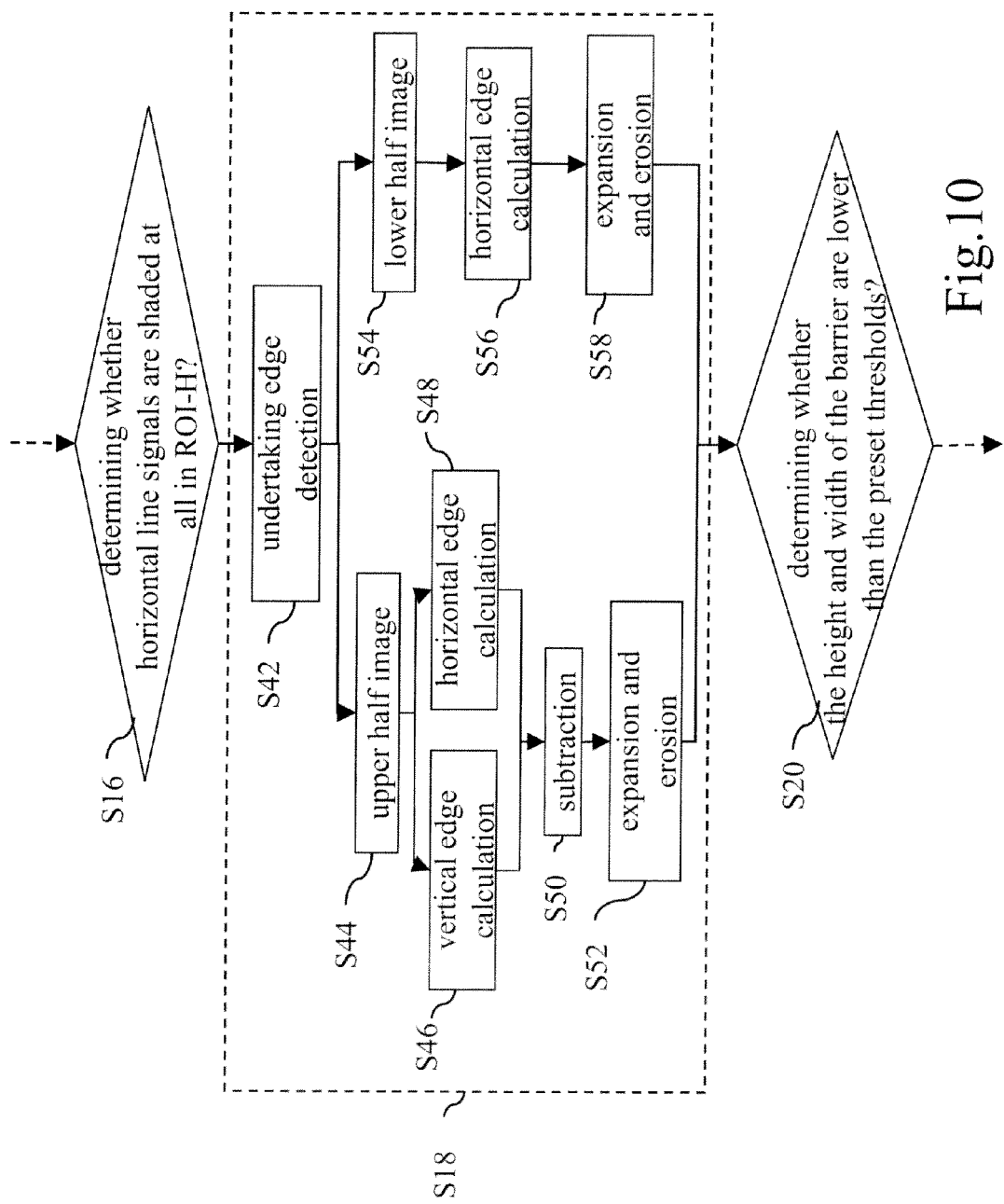
FIG. 10 is a flowchart of detecting barrier contours according to one embodiment of the present invention.

Refer to FIG. 10. Step S18, which detects the contours of a barrier, further comprises Steps S42-S58. Refer to FIG. 1 and FIG. 2 also. In Step S42, the processing device 14 uses the edge information of the high-frequency image, such as the Sobel or Canny filter, to undertake edge processing, and then undertakes edge detection, wherein the horizontal line defined earlier is used as the central line of the image detection area, and wherein the region above the central line is referred to as the upper half image in Step S44, and wherein the region below the central line is referred to as the lower half image in Step S54. The vertical edge calculation and the horizontal edge calculation of the upper half image are respectively undertaken in Step S46 and Step S48. Next, the horizontal edges are subtracted from the vertical edges in Step S50. The horizontal edge calculation of the lower half image is undertaken in Step S56. Next, expansion and erosion are undertaken in Step S58 to enhance the image.

Figure 11:
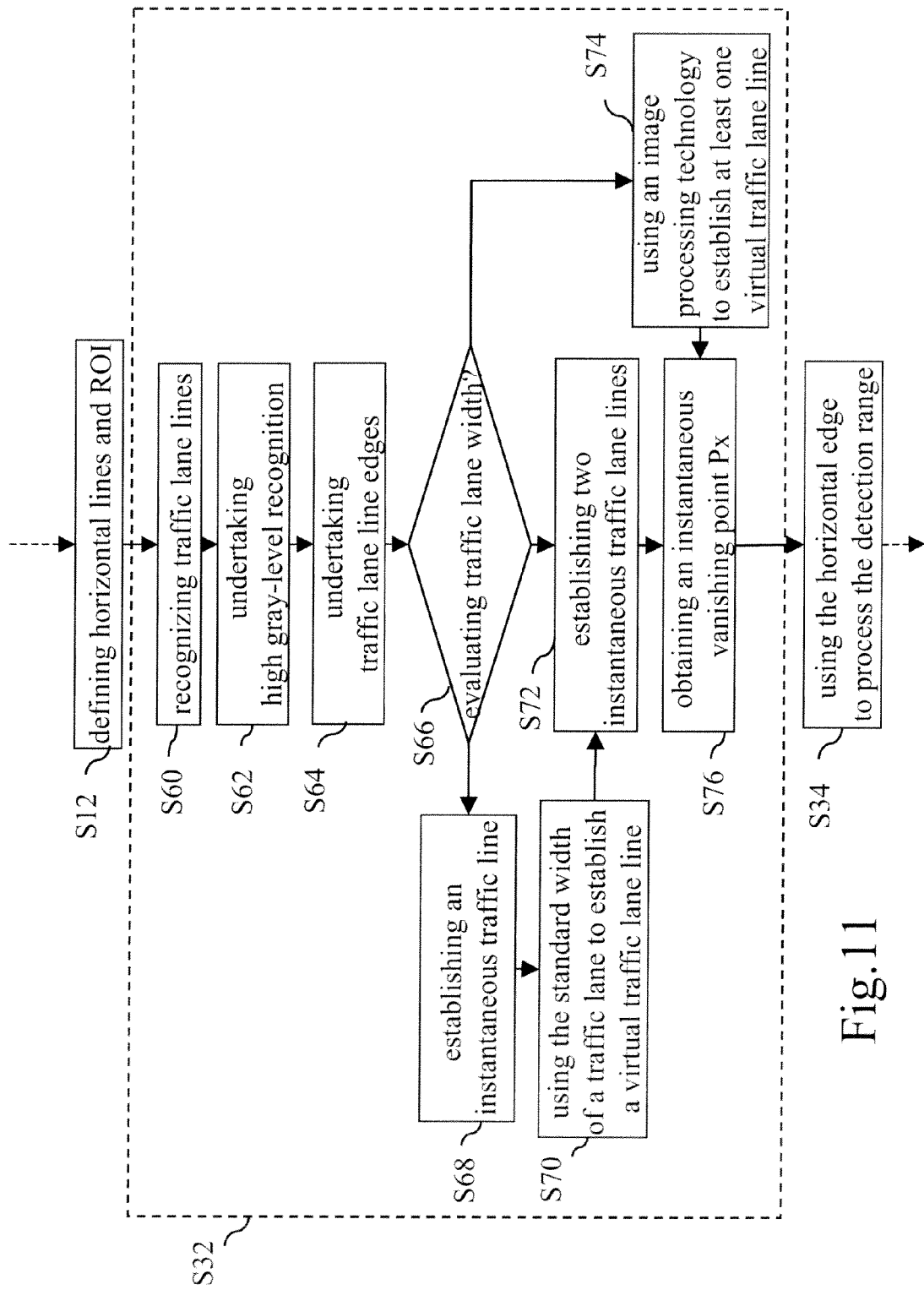
FIG. 11 is a flowchart of detecting traffic lane lines according to one embodiment of the present invention.

Refer to FIG. 11. Step S32, which sets the detection range of the vanishing point horizontal line, further comprises Steps S60-S76. Refer to FIG. 1 and FIG. 9 also. In Step S60, traffic lane lines are recognized with the features thereof. In Step S62, high gray-level recognition is undertaken. In Step S64, traffic lane line edge recognition is undertaken. In Step S66, traffic lane width evaluation is undertaken, wherein the road image is analyzed to obtain the characteristic points of the traffic lane lines, and wherein the lower half of the road image is divided into a plurality of sections, and wherein the sections are scanned bottom up to update the characteristic points of the traffic lane lines in realtime. If only the characteristics of the traffic lane line of a single side of the road are detected, an instantaneous traffic line is established in Step S68. If the characteristics of the traffic lane lines of both sides of the road are detected, the processing device 14 establishes two instantaneous traffic lane lines $L_1$ and $L_2$ in Step S72. Many country roads do not have traffic lane lines. Considering such a case, virtual traffic lane lines are established according to the standard width of a traffic lane in Step S74.

Figure 12:
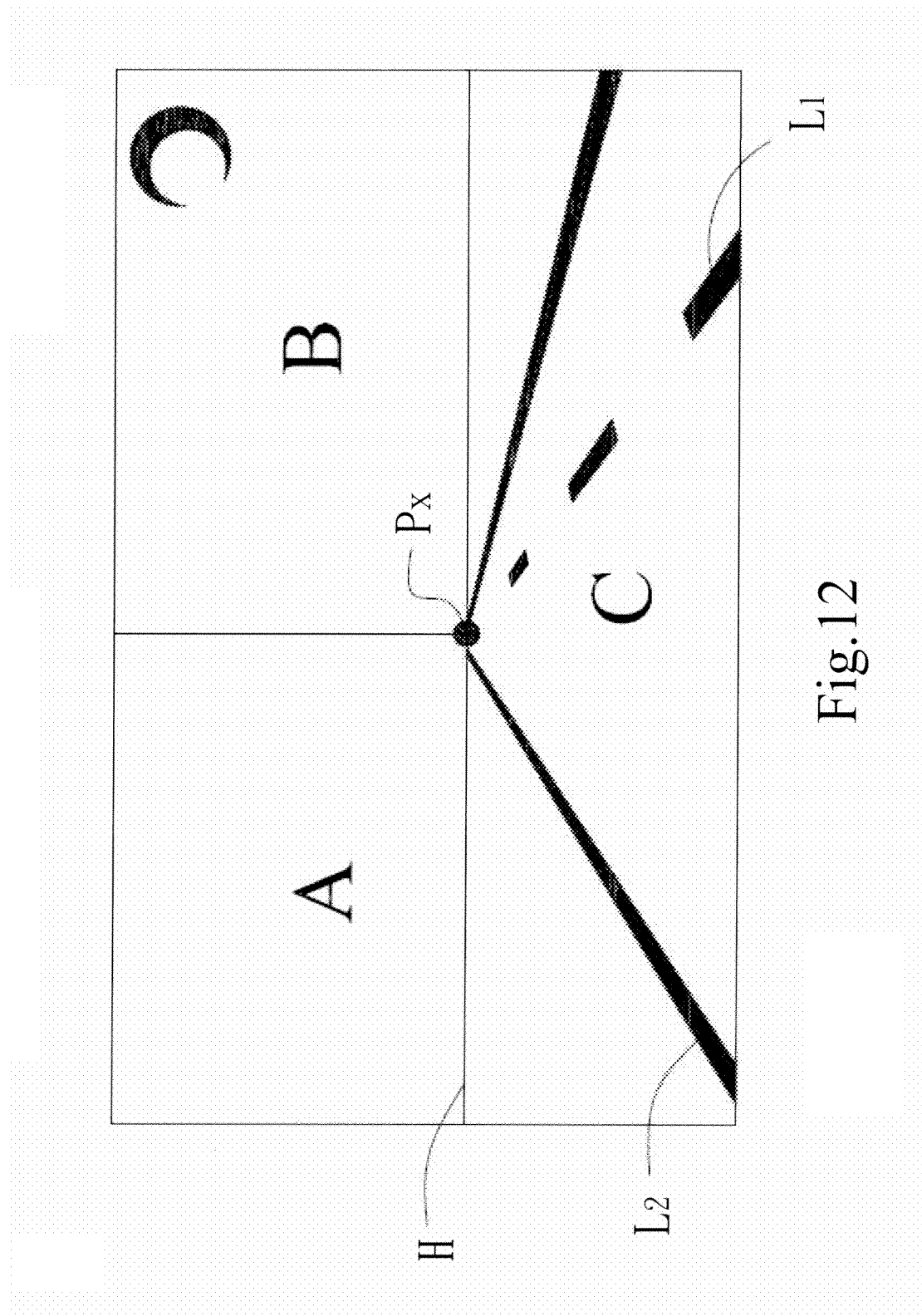
FIG. 12 is a diagram schematically showing that a far-end vanishing point according to one embodiment of the present invention.

Refer to FIG. 1, FIG. 11 and FIG. 12. If the process comes to Step S68, it means that the processing device 14 only establishes the traffic lane line of a single side. Herein, the traffic lane line $L_1$ is used as an exemplification of the single-side traffic line. In such a case, the standard width of a traffic lane is added to the existing traffic lane line $L_1$ to establish a virtual traffic lane line $L_2$ in Step S70, which is equivalent to the case in Step S72 that establishes two traffic lane lines. Next, the process proceeds to Step S76, wherein the instantaneous traffic lane line $L_1$ and the virtual traffic lane line $L_2$ are extended to a far end to obtain an instantaneous vanishing point $P_x$. An arbitrary line parallel to the instantaneous traffic lane line may also function as the virtual traffic lane line to obtain an instantaneous vanishing point $P_x$.

When neither the left traffic lane line nor the right traffic lane line is drawn in a road, an image processing technology is used to establish at least one virtual traffic lane line in Step S74. Refer to FIG. 13. In Step 80, undertake edge detection to obtain a plurality of characteristic points of the traffic lane from edges in the image, e.g. from the objects arranged parallel to the advancing direction of the vehicle, such as the front vehicles or the buildings beside the road. In Step S82, use the Hough Transform to analyze the characteristic points of the traffic lane and transform the characteristic points. In Step S84, undertake straight line detection to take out the characteristic points corresponding to a plurality of virtual traffic lane lines, and sequentially connect the characteristic points corresponding to each virtual traffic lane line to establish at least one virtual instantaneous traffic lane line. The virtual instantaneous traffic lane lines are extended to intersect at a far end to from an instantaneous vanishing point $P_x$ required in Step S76.

Refer to FIGS. 14A-14D. Refer to FIG. 2, FIG. 8 and FIG. 10 also. In the step of detecting the contours of a barrier, the horizontal line defined at beginning is used to partition the image into the upper half image and the lower half image, as shown in FIG. 14A. The upper half image is used to detect the heights of the horizontal edges of the barrier, as shown in FIG. 14B and FIG. 8. The upper half image is also used to detect the heights of the vertical edges of the barrier, as shown in FIG. 14C and FIG. 8. The lower half image is used to detect the position of the bottom of the barrier, as shown in FIG. 14D and FIG. 8. In the upper half image, the horizontal edges and vertical edges that have been processed beforehand are further processed with an expansion operation and an erosion operation to enhance the definition of the edges. Then, the horizontal edges are subtracted from the vertical edges to obtain the primary vertical edges. In the lower half image, the horizontal edges are processed with an expansion operation and an erosion operation to enhance the definition of the bottom edge. If both the recorded heights and recorded distances of the upper half image and the lower half image are greater than the preset thresholds, the edges of the designated possible barrier are projected to the vertical axis to undertake histogram statistics. The upper half image is scanned top down to find out, designate and record the topmost edge of the barrier and determine whether the height of the barrier exceeds the preset threshold. The lower half image is scanned top down to find out and designate the bottommost edge of the barrier. Then, the processing device 14 works out the distance between the image capture unit 11 and the bottom of the barrier and adds the distance information and the warning information to the original image and finally presents the image and the information on the display unit.

Figure 15:
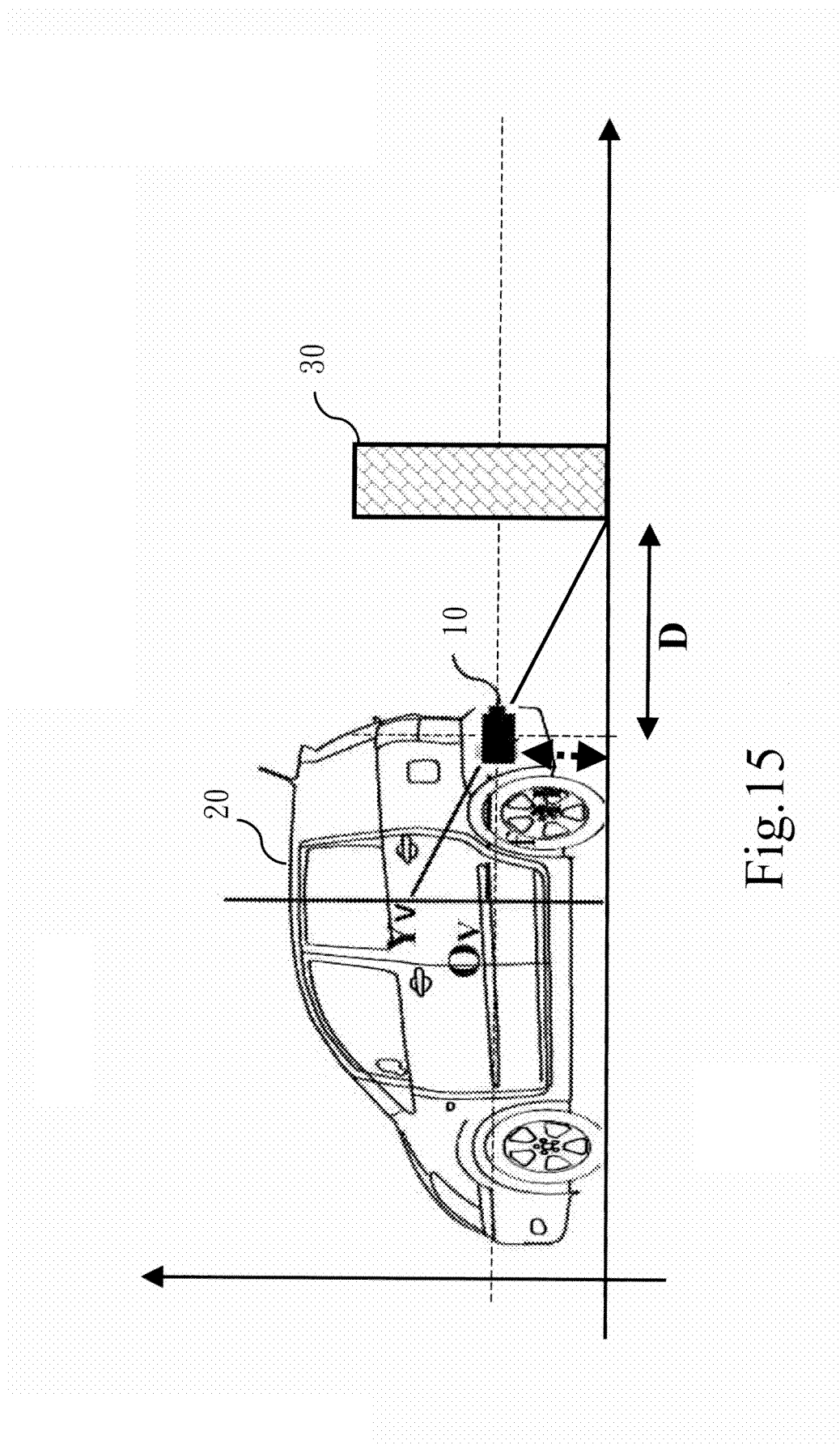
FIG. 15 is a diagram schematically showing a system architecture according to one embodiment of the present invention.

Refer to FIG. 15. In the present invention, the distance to a barrier is calculated according to Equation (2):

$$D=H*f/(Yv-Ov) \qquad (2)$$

wherein D=distance between the image capture unit 11 and the barrier, H=the altitude where the image capture unit 11 is installed, f=the focal length of the image capture unit 11, Ov=the center of the image, Yv=the position of the bottom of the barrier. In the present invention, the processing device 14 will output different alerts according to different distance-related emergency settings.

The present invention proposes a high-reliability and high-recognizability image-based barrier detection and warning system and a method thereof, which can overcome the problems of erroneous judgement and oversensitivity occurring in the conventional technology, and which replaces the conventional radar- and ultrasonics-based technologies with an image processing technology and a computer vision technology, whereby the driver can watch the surroundings of the vehicle directly and clearly and learn the relative positions of barriers, wherefore the driver can park more easily and safely.

The embodiments described above are only to exemplify the present invention but nit to limit the scope of the present invention. Any equivalent modification or variation according to the spirit of the present invention is to be also included within the scope of the present invention, which is based on the claims stated below.

What is claimed is:

1. An image-based barrier detection and warning system comprising:
   at least one image capture unit capturing a road image;
   at least one processing device electrically connected with said image capture unit, detecting a horizon and defining ROI-H (Region Of Interest-Height) according to a vanishing point proximate the detected horizon to establish a horizontal line signal according to said road image, determining whether said horizontal line signal exists in said ROI-H and whether said horizontal line signal is interrupted by a barrier, calculating a distance between said image capture unit and the barrier in ROI-G (Region Of Interest-Ground), and outputting a barrier warning instruction responsive to detection thereby of horizon interruption by the barrier within an image region defined by said ROI-H and ROI-G; and
   at least one warning device receiving said barrier warning instruction from said processing device and emitting at least one barrier warning alert.

2. The image-based barrier detection and warning system according to claim 1, wherein said processing device determines whether to output said barrier warning instruction according to a result of detecting an upper contour and a low contour of a barrier whose horizontal line signal is shaded.

3. The image-based barrier detection and warning system according to claim 1 further comprising an external signal pickup unit electrically connected with said processing device, receiving an external signal and providing said external signal for said processing device, wherein said external signal is a speed signal, a shift signal, or a steering wheel signal.

4. The image-based barrier detection and warning system according to claim 1, wherein said ROI-H of said horizontal line signal is preset by said processing device.

5. The image-based barrier detection and warning system according to claim 1, wherein said ROI-H of said horizontal line signal is determined by at least one traffic lane line in said road image and a virtual lane line.

6. An image-based barrier detection and warning method comprising steps:
   (a) capturing a road image;
   (b) detecting a horizon and defining ROI-H (Region Of Interest-Height) according to a vanishing point proximate the detected horizon to establish a horizontal line signal according to said road image;
   (c) determining whether said horizontal line signal exists in said ROI-H;
   (d) determining whether said horizontal line signal is interrupted by shading; if said horizontal line signal is shaded, proceeding to Step (e); if said horizontal line signal is not shaded, detecting a contour of an object and determining whether a height and a width of said object are greater than preset thresholds; if said height and said width of said object are not greater than said preset thresholds, returning to Step (a); if said height and said width of said object are greater than said preset thresholds, directly undertaking Step (h);
   (e) downwardly detecting a horizontal edge from a center of said horizontal line signal in said ROI-H;
   (f) determining an upper edge and a lower edge of an object shading said horizontal line signal in said ROI-H and designating said upper edge and said lower edge;
   (g) determining whether said object is a barrier according to a position and a height of said horizontal edge; if said object is not a barrier, returning to Step (a); if said object is a barrier, undertaking Step (h);
   (h) calculating a distance to said barrier; if said distance is outside a preset distance range in ROI-G (Region Of Interest-Ground), returning to Step (a); if said distance is within said preset distance range in said ROI-G, undertaking Step (i); and
   (i) emitting a warning signal and undertaking Step (a) responsive to detection thereby of horizon interruption by the barrier within an image region defined by said ROI-H and ROI-G.

7. The image-based barrier detection and warning method according to claim 6, wherein said Step (c) further comprises steps:
   (c1) setting a detection range of a vanishing horizontal line in said road image;
   (c2) undertaking horizontal edge processing on said detection range of said vanishing horizontal line;
   (c3) vertically projecting said road image to a horizontal axis;
   (c4) undertaking histogram statistics; and
   (c5) determining whether a histogram smaller than said preset threshold exists; if a histogram smaller than said preset threshold exists, returning to Step (b); if a histogram smaller than said preset thresholds does not exist, undertaking Step (d).

8. The image-based barrier detection and warning method according to claim 6, wherein detecting a contour of an object in said Step (d) further comprises steps:
   (d1) detecting edges and detecting an upper half image and a lower half image;
   (d2) undertaking horizontal edge calculation and vertical edge calculation and subtracting horizontal edges from vertical edges in said upper half image; undertaking horizontal edge calculation in said lower half image; and
   (d3) using an expansion operation and an erosion operation to enhance definition of said images.

9. The image-based barrier detection and warning method according to claim 6, wherein said ROI-H of the horizontal line signal is preset by a processing device in said Step (b).

10. The image-based barrier detection and warning method according to claim 6, wherein said ROI-H of the horizontal line signal is determined by at least one traffic lane line in said road image and a virtual lane line in said Step (b).

* * * * *